United States Patent
Nam et al.

(10) Patent No.: US 8,289,006 B2
(45) Date of Patent: Oct. 16, 2012

(54) OPTIMIZED SYSTEM VOLTAGE CONTROL METHOD THROUGH COORDINATED CONTROL OF REACTIVE POWER SOURCE

(75) Inventors: Su-Chul Nam, Daejeon (KR); Jeong-Hoon Shin, Daejeon (KR); Seung-Tae Cha, Daejeon (KR); Jae-Gul Lee, Daejeon (KR); Tae-Kyun Kim, Daejeon (KR)

(73) Assignee: Korea Electric Power Corporation, Gangnam-gu (KR)

( * ) Notice: Subject to any disclaimer, the term of this patent is extended or adjusted under 35 U.S.C. 154(b) by 580 days.

(21) Appl. No.: 12/569,270

(22) Filed: Sep. 29, 2009

(65) Prior Publication Data
US 2010/0106338 A1 Apr. 29, 2010

(30) Foreign Application Priority Data
Oct. 29, 2008 (KR) .................. 10-2008-0106744

(51) Int. Cl.
*G05F 1/70* (2006.01)
(52) U.S. Cl. ........................... 323/205
(58) Field of Classification Search ........... 323/205–211
See application file for complete search history.

(56) References Cited

U.S. PATENT DOCUMENTS

| | | | | |
|---|---|---|---|---|
| 3,968,422 A * | 7/1976 | Waldmann | .................. | 323/207 |
| 5,610,501 A * | 3/1997 | Nelson et al. | .................. | 323/207 |
| 5,646,511 A * | 7/1997 | Akamatsu et al. | ............ | 323/207 |
| 5,751,138 A * | 5/1998 | Venkata et al. | ............... | 323/207 |
| 5,942,880 A * | 8/1999 | Akamatsu et al. | ............ | 323/210 |
| 6,008,548 A * | 12/1999 | Fenner et al. | ................. | 307/105 |
| 6,023,152 A * | 2/2000 | Briest et al. | .................... | 323/207 |
| 6,900,619 B2 * | 5/2005 | Kehrli et al. | .................. | 323/207 |
| 7,265,521 B2 * | 9/2007 | Kehrli et al. | .................. | 323/207 |
| 7,683,589 B2 * | 3/2010 | Temma et al. | ................ | 323/210 |
| 7,990,743 B2 * | 8/2011 | Walling et al. | ................. | 363/71 |
| 7,994,658 B2 * | 8/2011 | Cardinal et al. | ............... | 307/84 |

OTHER PUBLICATIONS

Kim, Tae-Kyun, et al., A study on Voltage and Reactive Power Control Methodology using Integer Programming and Local Subsytem, w/English abstract thereof, Integer Programming, 2008, pp. 543-550.
Korean Office Action, issued in Korean Patent Application No. 10-2008-0106744, dated Jul. 30, 2010.

* cited by examiner

*Primary Examiner* — Adolf Berhane
(74) *Attorney, Agent, or Firm* — McDermott Will & Emery LLP

(57) ABSTRACT

Provided is an optimized system voltage control method through coordinated control of reactive power source, which analyzes the location for reactive power compensation and the effect of applying compensation equipment by calculating the reactive power and voltage sensitivity of a power system, thus improving the voltage quality of the power system. The optimized system voltage control method includes verifying a voltage violation substation having a voltage exceeding a predetermined voltage reference value among buses of a test system on a computer program, configuring a local system with eight to ten substations with respect to the verified voltage violation substation, generating a reduced local system using a reduced local algorithm with respect to the buses within the configured local system, calculating a power flow by determining a voltage control amount for restoring the voltage of the voltage violation substation to a normal value with respect to the reduced local system, and calculating an optimization objective function value based on the voltage control amount and control operation.

6 Claims, 6 Drawing Sheets

Fig 3

| Bus number | Bank number | Unit capacity(MVAR) |
|---|---|---|
| Bus 3 | 3 | 100 |
| Bus 5 | 3 | 50 |
| Bus 7 | 3 | 50 |
| Bus 9 | 3 | 100 |
| Bus 12 | 1 | 50 |
| Bus 16 | 3 | 100 |

Fig 4

| Kinds of assumed accidents | Cut off line path between fifth and sixth buses |
|---|---|
| | Cut off line path between sixth and seventh buses |

Fig 5

| Bus number | Voltage(P.U) |
|---|---|
| Bus 7 | 0.852 |
| Bus 8 | 0.857 |
| Bus 5 | 0.870 |
| Bus 4 | 0.891 |
| Bus 14 | 0.919 |
| Bus 15 | 0.943 |
| Bus 13 | 0.949 |

Fig 6

| Bus number | Voltage(P.U) |
|---|---|
| Bus 7 | 0.863 |
| Bus 8 | 0.868 |
| Bus 5 | 0.882 |
| Bus 4 | 0.899 |
| Bus 14 | 0.924 |
| Bus 15 | 0.1945 |

Fig 7

| Bus number | Voltage(P.U) |
|---|---|
| Bus 7 | 0.874 |
| Bus 8 | 0.879 |
| Bus 5 | 0.894 |
| Bus 4 | 0.906 |
| Bus 14 | 0.924 |
| Bus 15 | 0.948 |

Fig 8

| Bus number | Voltage(P.U) |
|---|---|
| Bus 7 | 0.885 |
| Bus 8 | 0.890 |
| Bus 5 | 0.907 |
| Bus 4 | 0.914 |
| Bus 14 | 0.934 |

Fig 9

| Bus number | Voltage(P.U) |
|---|---|
| Bus 7 | 0.901 |
| Bus 8 | 0.905 |
| Bus 5 | 0.918 |
| Bus 4 | 0.921 |
| Bus 14 | 0.938 |

Fig 10

| Bus number | Voltage(P.U) |
|---|---|
| Bus 7 | 0.918 |
| Bus 8 | 0.919 |
| Bus 5 | 0.928 |
| Bus 4 | 0.929 |
| Bus 14 | 0.942 |

Fig 11

| Bus number | Voltage(P.U) |
|---|---|
| Bus 8 | 0.935 |
| Bus 4 | 0.935 |
| Bus 7 | 0.936 |
| Bus 5 | 0.941 |
| Bus 14 | 0.947 |

Fig 12

| Bus number | Voltage(P.U) |
|---|---|
| Bus 4 | 0.942 |
| Bus 8 | 0.948 |
| Bus 7 | 0.950 |

Fig 13

| Bus number | Voltage(P.U) |
|---|---|
| Bus 4 | 0.948 |

OPTIMIZED SYSTEM VOLTAGE CONTROL METHOD THROUGH COORDINATED CONTROL OF REACTIVE POWER SOURCE

CROSS-REFERENCE TO RELATED APPLICATION

This application claims priority to and the benefit of Korean Patent Application No. 2008-0106744, filed on Oct. 29, 2008, the disclosure of which is incorporated herein by reference in its entirety.

BACKGROUND

1. Field of the Invention

The present application relates to an optimized system voltage control method through coordinated control of reactive power source, and more particularly, to an optimized system voltage control method through coordinated control of reactive power source, which analyzes the location for reactive power compensation and the effect of applying compensation equipment by calculating the reactive power and voltage sensitivity of a power system, thus improving the voltage quality of the power system.

2. Discussion of Related Art

Recently, the supply and demand of reactive power have become unstable due to an increase in power loss during long distance power transmission from a remote power source and a change in load characteristics of power consumers, which may cause a large-scale power interruption.

One of the methods widely used to solve the unstable reactive power supply is to adjust the reactive power using a phase adjusting device.

In this case, when the voltage is low due to a lack of reactive power in a power system, a capacitor for supplying the reactive power is used, or a reactor for consuming the reactive power is interrupted. On the contrary, when an over-voltage occurs due to excessive reactive power in the power system, the capacitor for supplying the reactive power is interrupted, or the reactor for consuming the reactive power is used.

The control of the reactive power using the phase adjusting device has the advantage that can accomplish its desired purposes with a relatively simple operation and a relatively low cost.

However, according to a conventional method for controlling the phase adjusting device, since the control operation is performed based on only the voltage of a bus(substation) in which the phase adjusting device is provided, there are possibilities that an over-voltage and a low voltage may occur in a peripheral system.

Moreover, an optimized control operation may not be performed due to the individual control and, since the control operation is performed for the purpose of simply maintaining the voltage, it causes an increase in the loss of the power system.

SUMMARY OF THE INVENTION

The present invention has been made in an effort to solve the above-described problems associated with the prior art, and an object of the present invention is to provide an optimized system voltage control method through coordinated control of reactive power source, which can solve the problem of an unstable reactive power supply, which is caused by an increase in power loss during long distance power transmission from a remote power source and a change in load characteristics of power consumers.

According to an aspect of the present invention, there is provided an optimized system voltage control method through coordinated control of a reactive power source, the method including: verifying a voltage violation bus having a voltage exceeding a predetermined voltage reference value among buses of a test system on a computer program; configuring a local system with eight to ten substations with respect to the verified voltage violation bus; generating a reduced local system using a reduced local algorithm with respect to the buses within the configured local system; calculating a power flow by determining a voltage control amount for restoring the voltage of the voltage violation bus to a normal value with respect to the reduced local system; and calculating an optimization objective function value based on the voltage control amount and control operation.

The generating of the reduced local system may use the following algorithm:

$$\begin{bmatrix} \Delta Q_0 \\ \Delta Q_S \end{bmatrix} \approx \begin{bmatrix} \frac{\partial Q_0}{\partial V_0} & \frac{\partial Q_0}{\partial V_S} \\ \frac{\partial Q_S}{\partial V_0} & \frac{\partial Q_S}{\partial V_S} \end{bmatrix} \begin{bmatrix} \Delta V_0 \\ \Delta V_S \end{bmatrix}$$

wherein $\Delta Q_0$ represents the change in reactive power of buses not included in the local system, $\Delta V_2$ represents the change in voltage of the buses not included in the local system, $\Delta Q_S$ represents the change in reactive power of the buses included in the local system, and $\Delta V_S$ represents the change in voltage of the buses included in the local system, in which the reduced local system represented as a subset may be subdivided into a plurality of reduced local systems with respect to each of the buses having a transformer tap, a parallel capacitor and a reactor.

The generating of the reduced local system may include configuring a gradual system according to a control level of the buses having an effect on the voltage violation bus based on an electrical distance calculated using the reduced local algorithm.

The generating of the reduced local system may include generating each reduced local system by repeating the generating of the reduced local system based on the bus having a phase adjusting device in the reduced local system.

The calculating of the optimization objective function value may use the following algorithm:

$$\underset{k_i}{\text{Min}} \sum_{i=1}^{n} |k_i| C_i + F(k_1, \ldots, k_n)$$

$$\text{s.t.} \quad \sum_{i=1}^{n} |k_i| \leq N_{SW} \text{ and } k_i \in \{-1, 0, 1\}$$

wherein $k_i$ represents the status of switching of the phase adjusting device, $C_i$ represents the switching cost of the phase adjusting device, $F(k_1, \ldots, k_n)$ represents the penalty function to decide the operation priority of the phase adjusting device, $N_{sw}$ represents the maximum number of switching operations which are allowable in the once repeated calculating steps of the control method, $-1$ represents the opening of the phase adjusting device, $0$ represents the non-switching, $+1$ represents the operation of the phase adjusting device, in which the smaller the $N_{sw}$ value is, the more conservative the control results are.

That is, the optimization objective function is calculated to find the minimum value of $\Sigma_{i=1}^{n}|k_i|C_i+F(k_1,\ldots,k_n)$ according to $k_i$ such that $\Sigma_{i=1}^{n}|k_i|\leq N_{sw}$ and $k_i\epsilon\{-1,0,1\}$.

When a voltage of local system is in the range of voltage maintaining, the penalty function becomes 0. And when a voltage of local system is out of range, a user set priority to operation of specific control device or set penalty to retrieve behind. The larger the value of the penalty function is, the later the operation of the control device is set.

A control element, a control amount, and a control operation, by which the value of objective function is minimized, may be selected as a solution of the objective function.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3 is a table showing the status of S.C applications in an object system related to voltage control;

FIG. 4 is a table showing the list of assumed accidents applied to generate a low voltage in the object system;

FIG. 5 is a table showing the occurrence status of low voltage (below 0.95 PU) in the object system after applying assumed accidents;

FIG. 6 is a table showing the low voltage bus status in the object system after a phase adjusting device is applied to a fifth bus;

FIGS. 7 and 8 are tables showing the low voltage bus status in the object system after a further phase adjusting device is applied to the fifth bus;

FIGS. 9 to 11 are tables showing the low voltage bus status in the object system after a further phase adjusting device is applied to a seventh bus; and FIGS. 12 and 13 are tables showing the low voltage bus status in the object system after a further phase adjusting device is applied to a ninth bus.

DETAILED DESCRIPTION OF EXEMPLARY EMBODIMENTS

Figure 1:
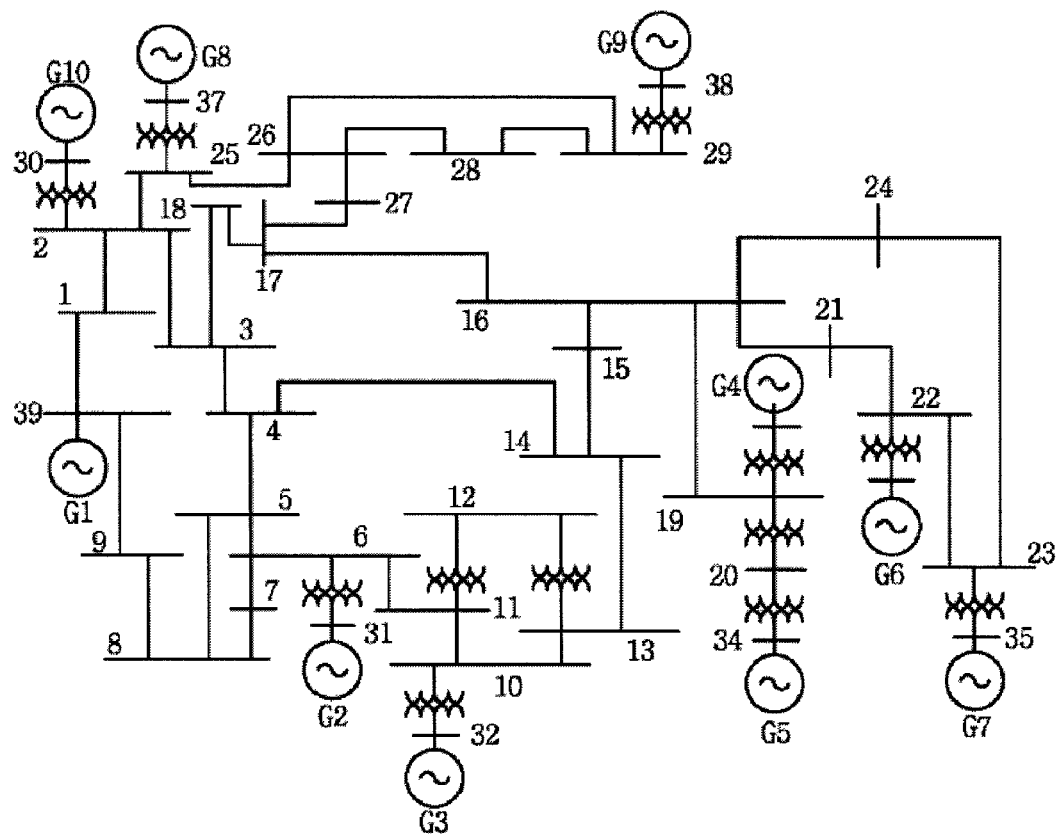
FIG. 1 is shows a test system used in an optimized system voltage control method through coordinated control of reactive power source in accordance with an embodiment of the present application.

Hereinafter, exemplary embodiments of the present invention will be described in detail below with reference to the accompanying drawings such that those skilled in the art to which the present invention pertains can easily practice the present invention.

Elements having similar structures and functions are designated by the same reference numerals refer to like elements having similar structures and functions throughout the specification.

Figure 2:
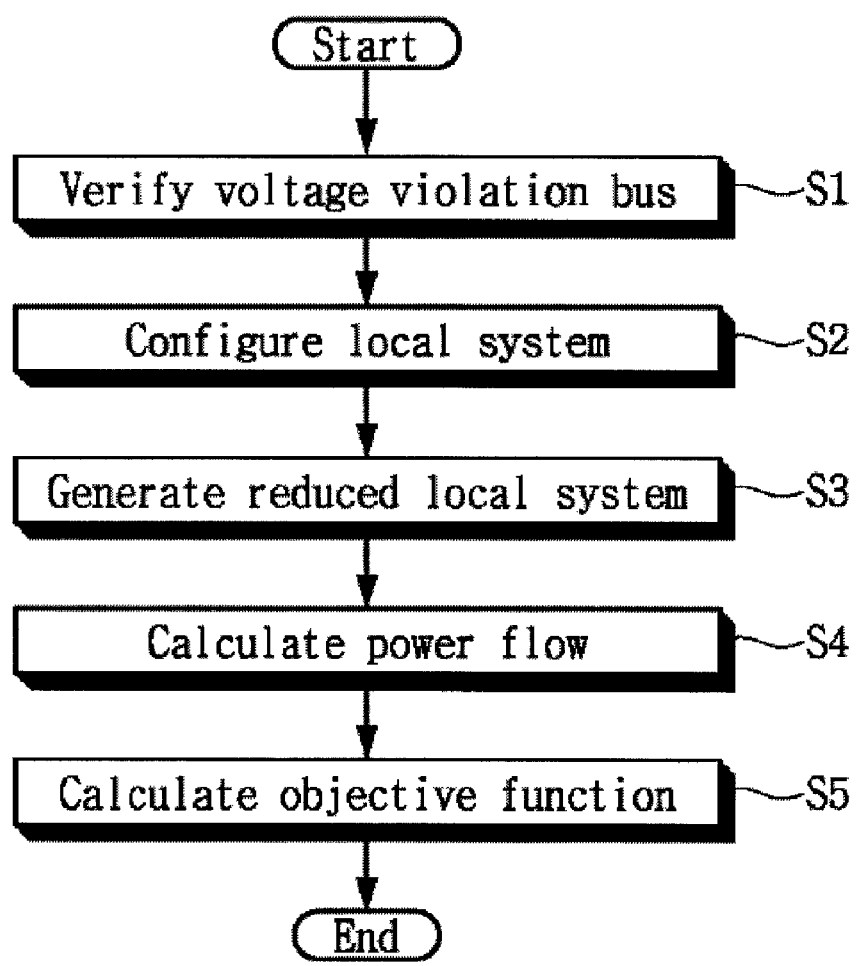
FIG. 2 is a flow chart of an optimized system voltage control method.

FIG. 2 is a flow chart illustrating an optimized system voltage control method through coordinated control of reactive power source in accordance with an embodiment of the present application Referring to FIG. 2, the optimized system voltage control method through coordinated control of reactive power source includes a voltage violation bus verification step S1, a local system configuration step S2, a reduced local system generating step S3, a power flow calculation step S4 and an objective function calculation step S5.

The optimized system voltage control method through coordinated control of reactive power source in accordance with an embodiment of the present application will be described in detail with reference to FIGS. 2 to 13 as below.

First, as shown in FIG. 1, a test system having a total power demand of 6,247 MW includes ten generators G1 to G10 and thirty five line paths 1 to 35, and twelve transformers.

Then, as shown in FIG. 2, the voltage violation bus verification step S1 is performed. That is, a voltage violation bus having a voltage exceeding a predetermined reference value is verified.

Next, the local system configuration step S2 is performed based on the result of the voltage violation bus verification step S1.

In the local system configuration step S2, a local system is configured with eight to ten substations with respect to the voltage violation bus.

The reason that the number of buses is limited to eight to ten is to reduce the number of buses for calculating an electrical distance.

Referring to FIGS. 3 to 5, tables for performing the reduced local system generation step S3, which generates a reduced local system from the buses classified in the local system configuration step S2, are shown.

FIG. 3 is a table showing the status of static condenser (S.C) installations in an object system related to voltage control. FIG. 4 is a table showing the list of assumed accidents applied to generate a low voltage in the object system. The assumed accidents shown in FIG. 4 are applied simultaneously to generate a low voltage in the object system. FIG. 5 is a table showing the status of low voltage occurrence (below 0.95 PU) in the object system after applying the assumed accidents. In other words, referring to FIGS. 3 to 5, only for the buses which is generated at the local system configuration step S2 and are within the local system, after calculating the electrical distance from voltage controlling object bus, the reduced local system including the buses located within a predetermined electrical distance is generated.

In this case, if a subset of the buses included in the local system is represented as S, the algorithm that constitutes the reduced local system may be represented by the following equation:

$$\begin{bmatrix}\Delta Q_0\\ \Delta Q_S\end{bmatrix}\approx\begin{bmatrix}\dfrac{\partial Q_0}{\partial V_0} & \dfrac{\partial Q_0}{\partial V_S}\\ \dfrac{\partial Q_S}{\partial V_0} & \dfrac{\partial Q_S}{\partial V_S}\end{bmatrix}\begin{bmatrix}\Delta V_0\\ \Delta V_S\end{bmatrix}$$

wherein $\Delta Q_0$ and $\Delta V_0$ are factors related to the buses located outside the subset S, and $\Delta Q_s$ and $\Delta V_s$ are factors related to the buses located in the subset S.

That is, $\Delta Q_0$ may represent the change in reactive power of the buses not included in the local system, $\Delta V_0$ may represent the change in voltage of the buses not included in the local system, $\Delta Q_s$ may represent the change in reactive power of the buses included in the local system, and $\Delta V_s$ may represent the change in voltage of the buses included in the local system.

As described above, since it is assumed that $\Delta V_0 \approx 0$ in the local system algorithm equation, that is, adjusting a phase adjusting device located in the subset S doesn't affect the change in voltage of the buses located outside the subset S, the above equation can be represented as follows:

$\Delta Q_S \approx [\partial Q_S/\partial Q_S][\Delta V_S]$ $\Delta V_S \approx [\partial V_S/\partial Q_S][\Delta Q_S]$ Here, the local system represented as the subset S is generated with respect to each of the buses having a transformer tap, a parallel capacitor and a reactor.

As such, the reduced local system generation step S3 is performed using the local system algorithm. The reason for generating the reduced local system is to select a bus to which a voltage penalty is applied during the analysis of voltage control effect.

Next, in the power flow calculation step S4, a voltage control amount for restoring the voltage of the voltage violation bus to a normal value is determined by a power flow calculation by repeating the reduced local system generation step S3 with respect to each of the voltage violation buses having the phase adjusting device.

Referring to FIGS. 6 to 13, in the objective function calculation step S5, an objective function value for the optimization is calculated based on each of the voltage control amounts and the control operations (opening and operation) obtained in the power flow calculation step S4. In this case, the objective function includes a voltage violation value of each bus, a circular reactive flow, and a weight value related to the application and use of a control device in the above-configured the local system.

The algorithm used in the objective function calculation step S5 is as follows.

$$\min_{k_i} \sum_{i=1}^{n} |k_i| C_i + F(k_1, \ldots, k_n)$$

$$\text{s.t.} \sum_{i=1}^{n} |k_i| \leq N_{SW} \text{ and } k_i \in \{-1, 0, 1\}.$$

wherein $k_i$ represents the switching of the specific control device (the phase adjusting device), $C_i$ represents the switching cost of the control device, $F(k_1, \ldots, k_n)$ represents the penalty function to decide the operation priority of the phase adjusting device, $-1$ represents the opening of the phase adjusting device, 0 represents the non-switching, $+1$ represents the operation of the phase adjusting device, $N_{sw}$ represents the maximum number of switching operations which are allowable in the once repeated calculating step of the control method.

In general, since a system operator tends to avoid switching off a plurality of voltage controller at a time, $N_{sw}$ is set to 1, and the smaller the $N_{sw}$ value is, the more conservative the control results are.

That is, the optimization objective function is calculated to find the minimum value of $\Sigma_{i=1}^{n} |ki|Ci+F(k1, \ldots, kn)$ according to ki such that $\Sigma_{i=1}^{n} |ki| \leq Nsw$ and ki $\in (-1, 0, 1)$.

When a voltage of local system is in the range of voltage maintaining, the penalty function becomes 0. And when a voltage of local system is out of range, a user set priority to operation of specific control device or set penalty to retrieve behind. The larger the value of the penalty function is, the later the operation of the control device is set.

Generally, the optimization method related to the voltage reactive power control may be implemented by minimizing the active power loss or by maximizing the accumulation of reactive power. The optimization method is achieved by minimizing the number of phase adjusting devices during operation in the system in consideration of the costs incurred by the opening and operation of the phase adjusting devices and by maximizing the number of phase adjusting devices available during the future voltage control.

Subsequently, the control element, control amount, and control operation, by which the results obtained using the above-described objective function algorithm are minimized, are selected as a solution of the optimized method. Then, if the voltage of all buses is recovered to a reference value, or if there is no need to operate the controller, the optimization method is terminated.

The objective function calculation step S5 will be described in detail with reference to FIGS. 6 to 13 below.

FIG. 6 is a table showing the low voltage bus status in the object system after the phase adjusting device is applied to a fifth bus shown in FIG. 1. That its, it can be seen that when S.C 50 MVAR was applied to the fifth bus, the voltage of a thirteenth bus was increased to fall within a reference value and the voltage of other six buses was also increased.

FIG. 7 is a table showing the low voltage bus status in the object system after a further phase adjusting device is applied to the fifth bus.

FIG. 8 is a table showing the low voltage bus status in the object system after a further phase adjusting device is applied to the fifth bus.

After S.C 50 MVAR was additionally applied to the fifth bus (total amount: 150 MVAR), the low voltage of fifteen bus was removed.

FIG. 9 is a table showing the low voltage bus status in the object system after a further phase adjusting device is applied to a seventh bus.

FIG. 10 is a table showing the low voltage bus status in the object system after a further phase adjusting device is applied to the seventh bus.

After S.C 50 MVAR was applied to the seventh bus, the bus which still significantly violated the voltage was the seventh bus. Accordingly, it was decided to additionally apply S.C 50 MVAR to the seventh bus based on an analysis result of the control effect with respect to each controller to effectively improve the voltage of the seventh bus.

FIG. 11 is a table showing the low voltage bus status in the object system after a further phase adjusting device is applied to a seventh bus.

After S.C 50 MVAR was additionally applied to the seventh bus (total amount: 100 MVAR), the bus which still significantly violated the voltage was the seventh bus. Accordingly, it was decided to additionally apply S.C 50 MVAR to the seventh bus based on the analysis result of the control effect with respect to each controller to effectively improve the voltage of the seventh bus.

FIG. 12 is a table showing the low voltage bus status in the object system after a further phase adjusting device is applied to a ninth bus.

After S.C 50 MVAR was additionally applied to the seventh bus (total amount: 150 MVAR), the bus which significantly violated the voltage was changed to an eighth bus. Accordingly, it was decided to apply S.C 100 MVAR to the ninth bus based on the analysis result of the control effect with respect to each controller to effectively improve the voltage of the eighth bus.

FIG. 13 is a table showing the low voltage bus status in the object system after a further phase adjusting device is applied to a ninth bus.

After S.C 100 MVAR was applied to the ninth bus, the bus which significantly violated the voltage was changed to a fourth bus. Accordingly, it was decided to additionally apply S.C 100 MVAR to the ninth bus (total amount: 200 MVAR) based on the analysis result of the control effect with respect to each controller to effectively improve the voltage of the fourth bus.

Subsequently, it was decided to additionally apply S.C 100 MVAR to the ninth bus (total amount: 300 MVAR) based on the analysis result of the control effect with respect to each controller to solve the voltage violation of the fourth bus. As a result, the voltage of all buses fell within the reference value.

As described above, the optimized system voltage control method through coordinated control of reactive power source in accordance with an embodiment of the present application can effectively control the system voltage with the smallest adjustment amount in such a manner that a system operator sets an effective control area in view of the voltage and reactive power control, and the sensitivity between the voltage of each bus and the reactive power source is calculated to operate the phase adjusting device at the optimum location based on the power information within the control area.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An optimized system voltage control method through coordinated control of reactive power source, the method comprising:
    verifying a voltage violation bus having a voltage exceeding a predetermined voltage reference value among buses of a test system on a computer program;
    configuring a local system with buses within eight to ten substations with respect to the verified voltage violation bus;
    generating a reduced local system using a reduced local algorithm with respect to the buses within the configured local system;
    calculating a power flow by determining a voltage control amount for restoring the voltage of the voltage violation bus to a normal value with respect to the reduced local system; and
    calculating an optimization objective function value based on the voltage control amount and control operation.

2. The optimized system voltage control method of claim 1, wherein the generating of the reduced local system uses the following algorithm:

$$\begin{bmatrix} \Delta Q_o \\ \Delta Q_S \end{bmatrix} \approx \begin{bmatrix} \frac{\partial Q_o}{\partial V_o} & \frac{\partial Q_o}{\partial V_S} \\ \frac{\partial Q_S}{\partial V_o} & \frac{\partial Q_S}{\partial V_S} \end{bmatrix} \begin{bmatrix} \Delta V_o \\ \Delta V_S \end{bmatrix}$$

wherein $\Delta Q_O$ represents the change in reactive power of buses not included in the local system, $\Delta V_O$ represents the change in voltage of the buses not included in the local system, $\Delta Q_S$ represents the change in reactive power of the bus included in the local system, and $\Delta V_S$ represents the change in voltage of the buses included in the local system, wherein the reduced local system represented as a subset is subdivided into a plurality of reduced local systems with respect to each of the buses having a transformer tap, a parallel capacitor and a reactor.

3. The optimized system voltage control method of claim 1, wherein the generating of the reduced local system includes configuring a gradual system according to a control level of the buses having an effect on the voltage violation bus based on an electrical distance calculated using the reduced local algorithm.

4. The optimized system voltage control method of claim 1, wherein the generating of the reduced local system includes generating each reduced local system by repeating the generating of the reduced local system based on the bus having a phase adjusting device in the reduced local system.

5. The optimized system voltage control method of claim 1, wherein the calculating of the optimization objective function value uses the following algorithm:

$$\min_{k_i} \sum_{i=1}^{n} |k_i| C_i + F(k_1, \ldots, k_n)$$

$$\text{s.t.} \sum_{i=1}^{n} |k_i| \leq N_{SW}$$

$$k_i \in \{-1, 0, 1\}$$

wherein $k_i$ represents the switching of the phase adjusting device, $N_{sw}$ represents the maximum number of switching operations which are allowable in the once repeated calculating steps of the control method, −1 represents the opening of the phase adjusting device, 0 represents the non-switching, +1 represents the operation of the phase adjusting device, wherein the smaller the $N_{sw}$ value is, the more conservative the control results are.

6. The optimized system voltage control method of claim 5, a control element, a control amount, and a control operation, by which the value of objective function is minimized, are selected as a solution of the objective function.

* * * * *